Dec. 22, 1959    J. S. PAGE ET AL    2,918,249
FLUID PRESSURE ACTUATED CONTROL VALVE
Filed May 23, 1955    2 Sheets-Sheet 1
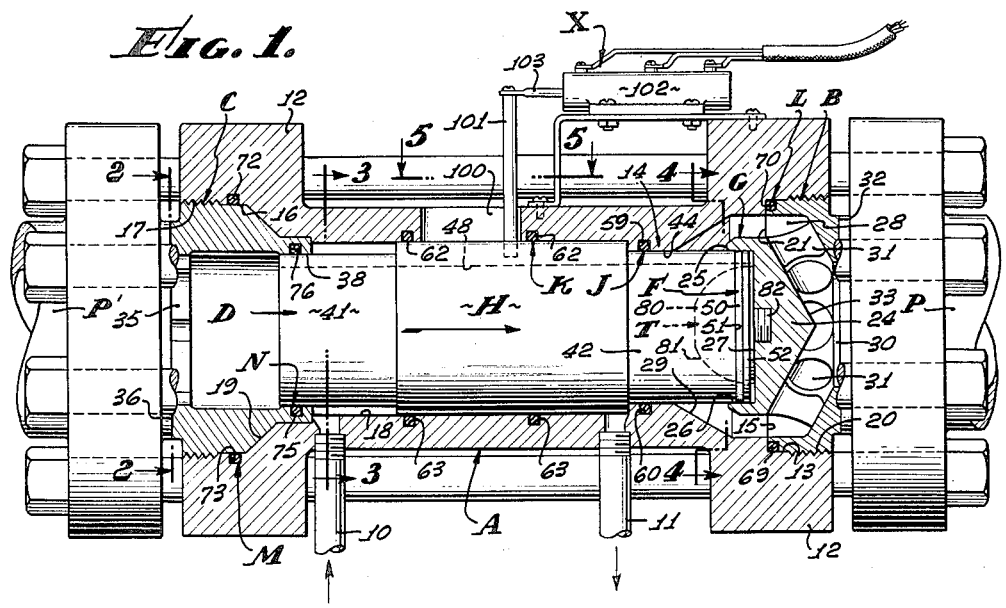
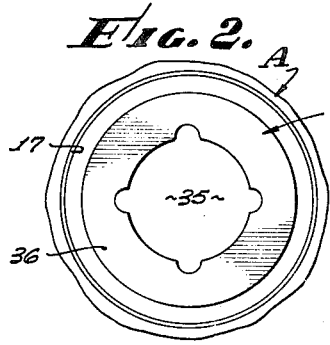
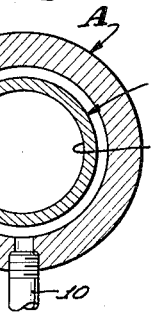
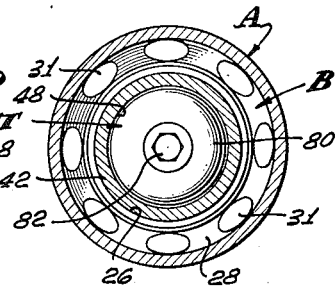
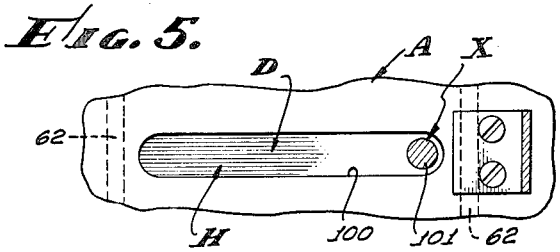
INVENTORS:
JOHN S. PAGE
JOHN S. PAGE, JR.
BY Maxwell & Maxwell
AGENTS.

Dec. 22, 1959
J. S. PAGE ET AL
2,918,249
FLUID PRESSURE ACTUATED CONTROL VALVE
Filed May 23, 1955
2 Sheets-Sheet 2
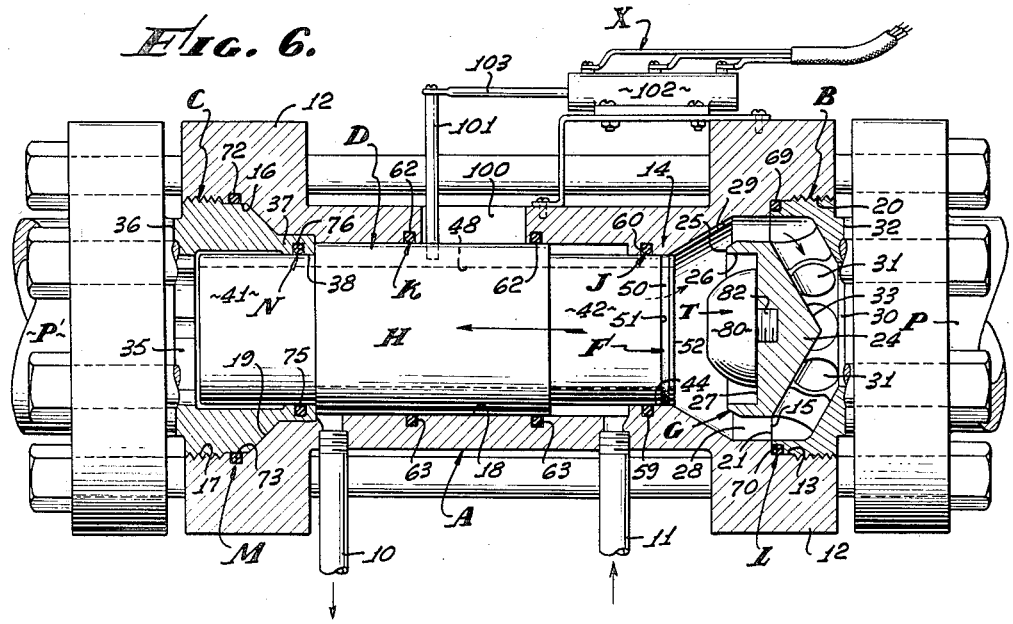
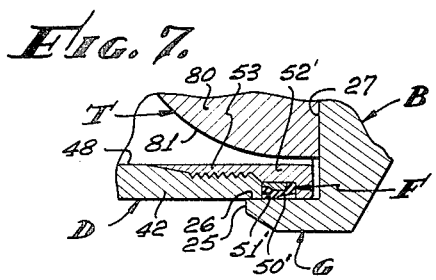
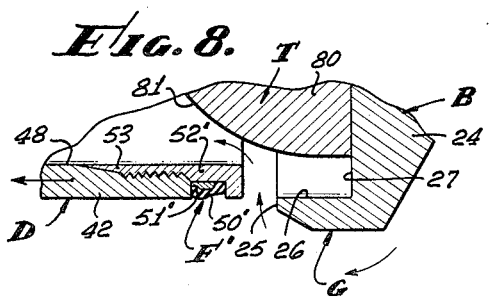
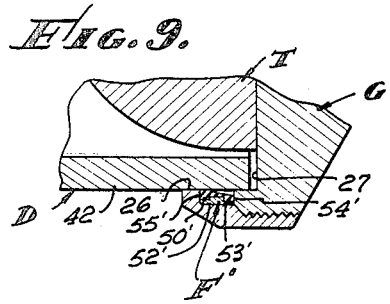
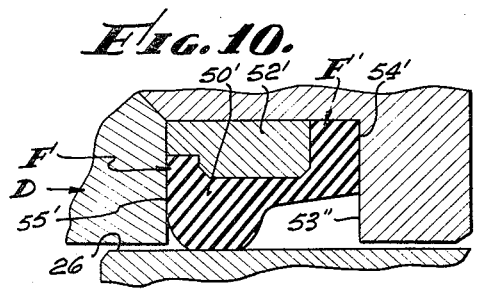
INVENTORS:
JOHN S. PAGE
JOHN S. PAGE, JR.
By Maxwell & Maxwell
AGENTS.

United States Patent Office 2,918,249
Patented Dec. 22, 1959

2,918,249
FLUID PRESSURE ACTUATED CONTROL VALVE

John S. Page and John S. Page, Jr., Long Beach, Calif.

Application May 23, 1955, Serial No. 510,234

9 Claims. (Cl. 251—31)

This invention has to do with a balanced fluid pressure actuated control valve and it is a general object of the invention to provide a simple, practical, improved valve construction that involves few parts and is inexpensive of manufacture and which can be used to advantage to control flow through a fluid line.

This application is copending with and is an improvement over our application Serial No. 413,076, filed March 1, 1954, entitled "Fluid Pressure Actuated Shut-Off Valve."

A general object of the present invention is to provide a valve mechanism wherein the valve element proper reciprocates and is such as to be operated relative to a seat by fluid pressure such as a separate source of fluid pressure or the fluid pressure handled or controlled by the valve, regardless of the direction in which pressure is applied to the valve. With the construction provided by the present invention, the valve when opened or closed, or when partially opened or closed, is perfectly balanced as affected by fluid pressure within the flow passages of the valve and is consequently easily controlled by means of any suitable source of fluid pressure even a considerably lower fluid pressure.

It is an object of the invention to provide a valve structure of the character referred to which is absolutely balanced under all operating conditions so that flow of fluid may occur in either direction through the valve without affecting the balance of the valve, whether it is opened or closed, or partially opened or closed.

Another object of the present invention is to provide a throttle type control valve of the general character referred to which is characterized by a hydraulically positioned shiftable unit slidably carried within a case, which unit is balanced and is of simple tubular formation.

An object of this invention is to provide a fluid handling structure of the character referred to which has full free flow of fluid therethrough, there being no restricted flow passages therein such as would hinder or retard the flow of fluid.

An object of the invention is to provide a seat that cooperates with a tubular valve element to have a throttling effect on the fluid handled by the valve, regardless of the direction of flow through the valve structure.

It is also an object to provide a valve structure of the character described with a seat having cooperative engagement with a sealing element that does not affect the balance of the shiftable tubular valve element.

Another object of this invention is to provide a valve structure for the control of a flow line to open and close and to partially throttle the line as circumstances require, which is of simple compact form suitable for incorporation in a pipe line, or the like, as between the ends of aligned pipe sections. The structure of the present invention can be advantageously incorporated in a pipe line without materially altering the direction of flow therein.

It is another object of this invention to provide a valve mechanism of the general character referred to which is of simple, practical, inexpensive construction, the entire mechanism being characterized by round or tubular elements which are of such form and proportioning as to be strong and compact and which are such that they can be readily manufactured in quantities and at a minimum of cost.

The mechanism that we have provided is characterized by an elongate tubular case. A bore enters the body from one end and terminates at a flange occuring intermediate the ends of the body. A stepped bore enters the body from the other end and has an inner portion that serves as a cylinder. A seat closure is provided at one end of the body and is secured thereto, preferably by a threaded connection. The seat closure serves to pass fluid to or from the interior of the body and, as shown, has a central longitudinal opening communicating with lateral ports in the base of the seat portion. A head closure is provided at the other end of the body where it is secured, as by threads, and it has an inner end portion bored to form a valve guide. The assembly of elements referred to is rigidly joined or connected between and in alignment with fluid handling pipe sections. The valve of the structure operates in the body and has a forward end portion that opposes the seat closure and which is slidably guided in the flange in the body. A piston is provided on the exterior of the valve and slides in the cylinder of the body while the rearmost end of the valve operates in the guide opening provided in the head closure. The end of the valve is provided with an annular portion which enters an annular channel formed in the seat, and when the valve is closed the annular portion engages and seals with a sealing ring carried in the channel.

In accordance with the present invention, the diameters of the ends of the valve element are alike so that the valve is balanced and will easily open or close even under the influence of high pressures in the flow passages by the application of comparatively low pressures introduced against the piston on the valve element.

The various objects and features of our invention will be fully understood from the following detailed description of typical preferred forms and applications of the invention, throughout which description reference is made to the accompanying drawings, in which:

Fig. 1 is a longitudinal sectional view of the structure that we have provided, the valve being shown in the closed position. Fig. 2 is an end view of a portion of the structure taken as indicated by line 2—2 on Fig. 1. Fig. 3 is a transverse sectional view taken through the body of the structure as indicated by line 3—3 on Fig. 1. Fig. 4 is a transverse sectional view taken as indicated by line 4—4 on Fig. 1. Fig. 5 is an enlarged side view of a portion of the valve that we have provided. Fig. 6 is a sectional view similar to Fig. 1, the valve being shown in the open position. Figs. 7 and 8 are enlarged detailed sectional views of a portion of the valve element and seat element of the structure and showing the valve in the closed and partially open position respectively. Fig. 9 is a view similar to Fig. 7 showing a modified form of the invention, and Fig. 10 is an enlarged detailed sectional view of the seal that we have provided.

The structure embodying the present invention involves, generally, a case made up of a body A, a seat closure B, a head closure C, and a valve D. A sealing means F operates between the valve and a seat G carried by closure B. A piston portion H provided on the valve D operates in a cylinder opening in the body A and fluid connections 10 and 11 are provided for the supply of operating fluid to the body so that it acts on the piston to move the valve between the open and closed positions. A sealing means J is provided between the valve and the body A. A sealing means K is provided between the valve and the body to prevent leakage past the piston H. A sealing means L is provided between the seat closure B and the body. A sealing means M is provided between the head closure C and the body and a sealing means N is provided between the head closure C and the rear end of the valve D. A suitable fluid control means may be provided to supply operating fluid to the connections 10 and 11.

The body A is an elongate tubular part which may, in practice, be designed so that it is of standard size and dimensions, that is, so that it is the same as fittings such as are ordinarily employed in connection with pipes P and P′ in connection with which the structure may be employed. Further, the body may, in practice, be formed and constructed so that it is substantially uniform in external configuration from one end to the other. In the preferred form of the invention, the body is round in cross section, and has suitable coupling flanges 12 at its ends to be connected with the pipe line.

A bore 13 enters the body A from one end, which we will term the forward end of the valve for the purpose of distinguishing it from the opposite end which we will refer to as the rear end of the valve. The bore 13 extends a substantial distance into the body and terminates at a near flange 14. The flange 14 is provided with a bore 44 that is concentric with the central axis of the body and receives the forward end of the valve D. A shoulder 15 is provided in the bore 13 near the forward end of the body and the flange 14 projects radially inward at a point intermediate the ends of the body.

A stepped bore 16 enters the body from the other or rear end and it has an outer threaded portion 17 somewhat larger in diameter than its inner portion 18 which is of substantial length and cylindrical in form to provide a cylindrical bore in the body to accommodate piston H. A shoulder 19 occurs where the outer portion 17 of the bore joins the inner cylinder portion 18.

The closure B provided at the forward end of the body A is referred to as a seat closure in that it carries or supports the seat G so that the seat occurs in the proper position within the body. The closure B also supports a flow tip T that is releasably connected to the closure as by a suitable threaded connection or fastener. In the particular case illustrated, the bore 13 is threaded at 20 into which the closure B is threaded so that it, in effect, plugs the end of the body. In the particular case illustrated, an inner face 21 on the closure seats against the shoulder 15 positioning the closure in the body.

The structure thus far described is the same as that disclosed in our copending application above referred to. However, the seat G is of entirely different and improved construction and is carried by the closure B at the inner end thereof and projects from the closure rearwardly and into the interior of the body to terminate in an end face 25 which is spaced forwardly from the flange 14. The seat G has an outer cylindrical wall and has a bore 26 that enters the face 25 and extends forwardly into the base portion 24 of the seat where it terminates in bottom 27. The bore 26 that extends between the face 25 and bottom 27 is concentric with the central axis of the body and is the same in diameter as the bore 44 above described and receives the forward end of the valve D. The base portion 24 of the seat is preferably joined to or is integral with the closure B, and an annular passage 28 of larger diameter than the base portion 24 surrounds the outer cylindrical wall of the seat G. The valve illustrated is a three inch valve having a normal cross sectional area of six and one-half square inches in which case the cross sectional area of the passage 28 may, in practice, be eight square inches. The passage 28 has an inner wall 29 that converges rearwardly and inwardly toward the flange 14.

The closure B is employed to pass fluid either to or from the interior of the body, and in a preferred arrangement of parts, a central longitudinal flow handling passage 30 is provided through the closure B and is in communication with the passageway 28 by means of lateral ports 31, as clearly shown throughout the drawings. The ports in the valve illustrated have a total cross sectional area of eight square inches. In practice, the closure B has a forward face 32 which abuts with a suitable pipe P, or the like. The base portion of the seat G has a forwardly facing wall 33 that forms a bottom for the passage 30, the wall being conical, in the preferred form of the invention, and tapering inwardly and forwardly to a point at the central axis of the valve at or near the face 32 of the closure B. The lateral ports 31 are, in practice, round or circular openings in the closure B on axes parallel with the surface of the cone-shaped wall 33. It is to be understood that any suitable form of connection can be provided between the pipe and the closure.

The head closure C is provided at the rear end of the body A and is secured thereto by a threaded connection. In the case illustrated, the construction at closure C is substantially the same as that at closure B, that is, the closure C is in the nature of a plug threaded into the threaded portion 17 of the bore 16. In the case illustrated, the closure C is adapted to pass fluid, and for this purpose has a central fluid passage 35. The pipe P′ is shown in abutment with a rear face 36 on the closure C and is shown connected to the flange 12 at the rear end of the body A. The inner end portion 37 of closure C is provided with a bore 38 forming a guide for the rear end 11 of the valve E. The bore 35 is of smaller diameter than the end of the valve D and forms a shoulder that is spaced from the rear end of the valve portion 11. It is a feature of the invention that the bore 38 is the same diameter as the bores 44 and 26, above described.

The valve D that characterizes the valve that we have provided is an elongate tubular element located centrally in the body A where it is confined between the closures B and C with a forward end 42 slidably supported in the opening or bore 44 formed through the flange 14 in the body A, and with a rear end 41 slidably engaged in the bore 38 provided in the closure C. It is a feature of the invention, that the forward and rear ends 42 and 41 are of the same diameter and are slidably received in the bores 44 and 38, respectively. Further, the forward end 42 is slidably received in the bore 26 of the valve seat G. The valve D being tubular, has a passage 48 extending through it from one end to the other, which passage may be uniform in size and shape throughout its length and substantially the same size as the passage 35 provided in the closure D, that is, about six and one-half square inches in cross sectional area.

The sealing means F serves to seal between the forward end portion of the valve E and the seat G and in accordance with the form of the invention shown in Figs. 1 to 6, it involves, an annular sealing ring 50 having a sealing surface coincidental with the diameters of the bores 38, 44, and 26. As shown, the ring 50 is carried at the forward end portion of the end 42 of the valve D and slidably engages with the bore 26 to have sealing engagement with the seat G. In this form of the invention, the annular sealing ring 50 is round in cross sectional configuration and is carried in an outwardly opening channel 51 in the outer periphery of the end 42. The channel 51 is formed by a retainer 52 threaded onto the end 42 and having a recess forming the channel and carrying the ring 50. The retainer 52 has a sleeve 53 extending into and threaded onto the inner wall of the tubular valve element.

The sealing means J provided between the forward end 42 of the valve D and the bore 44 in the body involves an annular sealing ring 59 carried in an annular recess 60 provided in the bore 44. The sealing ring 50 is a continuous annular member that can be engaged in the recess 60 as the valve is assembled with the body.

The sealing means K provided between the piston H and the bore 18 in the body involves annular sealing rings 62 engaged in longitudinally spaced annular recesses 63 in the cylinder bore 18. The sealing rings 62 are continuous annular members and are confined in the recess with their inner peripheries exposed to have sealing engagement with the outer surface of the piston H.

The sealing means L occurs between the closure B and the body A and includes a continuous annular sealing ring 69 carried in an annular recess 70 provided at the inner end of the closure B. The sealing ring 69 provides sealing engagement between the inner end of the closure B and the bore 18 of the body.

The sealing means M acts between the head closure C and the body A and may involve a continuous annular sealing ring 72 carried in an annular recess 73 provided in the periphery of the closure C. The ring 72 is a continuous annular part that provides sealing engagement between the closure C and the body A.

The sealing means N occurs between the closure C and the end 41 of the valve. The means N includes a continuous annular sealing ring 75 carried in an annular recess 76 provided in the inner bore 38 of the closure portion 37. The inner periphery of the ring has sealing engagement with the exterior of the valve part 41, and the ring 75, like the other sealing rings of the structure, can be arranged in place to be confined as the parts are assembled.

In accordance with the present invention, the outside diameters of the forward rear ends 42 and 41 of the valve D are identical in diameter and slidably engage with bores 44 and 38 that are identical in diameter. As a result of this relationship of parts, the valve D is perfectly balanced and will not be influenced by fluid pressure from within the flow passages through the structure. The valve D is, therefore, easily held in the desired operative position by the control means R hereinafter described, even when the valve is subjected to high operating pressures.

The flow tip T that we have provided cooperates with the valve D to control the flow of fluid through the passages 28 and 48 and through the pipe lines P and P'. That is, the flow of fluid is throttled by relative movement of the valve D to the flow tip T. In accordance with the invention, the flow tip T is carried by the seat G and involves a tapered projection 80 that extends into the passage 48 in the valve D when the valve is in the closed position, see Fig. 1. When the valve is open as shown in Fig. 6, the valve D is retracted from the valve seat and from the flow tip projection 80. The projection 80 is a round part somewhat smaller in diameter than the passage 48 and is concentrically carried by the seat G to project rearwardly from the bottom 27 to enter wholly or partially into the passage 48. As shown, the valve D retracts to the flange 14 while the projection 80 terminates short of the flange 14. In order to provide for gradual decrease or increase in flow of fluid as the valve D is shifted, the tapered projection 80 is provided with a rearwardly extending exterior wall 81 rounded or curved inwardly to cause increased flow as the valve D moves rearwardly. The projection 80 may be replaceable and held in place by any suitable fastener 82.

The valve illustrated in the drawings is actually longer than necessary in order to accommodate a position indicating means X. In this case the piston H is elongated and the spaced sealing means X are provided between the piston H and the bore 18 in the body. The sealing means K, as above described are spaced apart a distance somewhat greater than the travel of the valve D, and an elongate side opening 100 is provided in the side wall of the body. The opening extends longitudinally of the body and an indicating pin 101 is carried by the piston H and projects through the opening to be visible and accessible at the exterior of the body. When the valve D shifts, the pin 101 indicates the position of the valve. Further, we have provided an electrical transmitter 102 which may be any suitable lineal transmitter with a control rod 103 connected with the pin 101 and operable to transmit a signal corresponding to the position of the pin and the valve.

The fluid control means for supplying fluid pressure to the structure to shift or effect movement of the valve D to the open or closed positions may be employed to hold the valve in either position or in any desired intermediate position. As shown in Fig. 1, the end portions of the body cylinder portion 18 between the piston H and closure C and piston H and closure B are each fed with control or operating fluid through the fluid connections 10 and 11 respectively. So far as the broader aspects of the present invention are concerned, operating fluid pressure may be derived from any suitable source and may be introduced through the connections 10 and 11 under control of any suitable valves, or the like.

In Figs. 7 to 10 of the drawings, we have illustrated a sealing means F' that serves to seal between the forward end portion of the valve D and the seat G. The sealing means F' involves an annular sealing ring 50' having a sealing surface coincidental with the diameters of the bores 38, 44, and 26. As shown, the ring 50' may be carried by the seat G or by the valve D.

The ring 50' shown in Figs. 7 to 10 is of unique cross sectional configuration and involves an annular body 51' of resilient material and a back-up ring 52'. The body 51' may be made of rubber or like material that is bonded or otherwise carried or supported by the ring 52'. The ring 52' is carried in an inwardly opening channel 53' in the bore 26 of the seat G or an outwardly opening channel 53'' in the exterior of valve D. The channel 53' is formed by a retainer threaded onto the outer wall of the seat as above described in the first form of the invention. The retainer has a recess forming the channel that carries the ring 52'. In this form of the invention, the ring 50' has a flat radially disposed wall 54' of resilient material engaged with one side wall of the channel 53' or 53'' and a rounded lip 55' of resilient material engaged with the other side wall of the channel 53' or 53'' and engageable with the exterior of the valve D or the bore 26, as the case may be.

From the foregoing it will be apparent that we have provided an extremely effective and simple control or throttling valve that will operate reliably at high pressures without requiring large actuating cylinders and the like. With the construction above set forth, there are no restricted flow passages and, in fact, all the passages are as large if not larger in cross sectional area than the flow line being controlled by the valve. It is to be noted that the piston H of the valve that we have provided is only slightly larger than the outside diameter of the valve D itself. This is made possible by the construction that we have provided wherein the bores 38, 44 and 26 are identical in diameter so that the valve D is absolutely not affected by fluid pressure within the valve and is perfectly balanced. When the valve opens or closes the sealing means F engages and disengages the bore 26 at the same effective diameter as the other bores above referred to with the result that there is no tendency for the valve to stay opened or closed under the influence of fluid pressure in the passages 28 and/or 48. Furthermore, it is important to be observed that the valve is characterized by few simple easily-made parts which are turned parts such as can be readily manufactured from tubular stock and in a manner to be of maximum strength and durability.

Having described only typical preferred forms and applications of our invention, we do not wish to be limited or restricted to the specific details herein set forth, but wish to reserve to ourselves any variations or modifications that may appear to those skilled in the art and fall within the scope of the following claims.

Having described our invention, we claim:

1. A fluid handling control valve including: an elongate tubular body with a cylinder portion intermediate its ends; said body having axially spaced radially inwardly projecting portions therein providing bores; a seat member disposed at one end of said body and having a bore terminating in a bottom closing said bore in said seat member; said body having a passage extending from said bore around said seat member; a tubular valve member shiftably disposed in said body and slidable in said bores in said inwardly projecting portions from an open position with said tubular valve member spaced from said seat member to a closed position with said tubular valve member extending into the bore in said seat member; separate means on one of said members providing between said bore in said seat member and said tubular valve member a seal preventing the passage of fluid between said tubular valve member and said seat member when the valve member is in said closed position; a radially outwardly projecting piston on said tubular valve member operating between said inwardly projecting portions in said cylinder portion of said body; means for shifting said piston to shift said tubular valve member in opposite directions; said tubular valve member having equal opposed end areas exposed to fluid pressure in said bores; and the end of said tubular valve member extending into the bore of said seat member when said valve member is closed, having its entire end area subjected to fluid pressure when the valve member is fully closed to counteract the effect of fluid pressure on the other end of said tubular valve member.

2. A fluid handling control valve as defined in claim 1, including: a flow tip projecting into the bore in said seat member from said bottom; said flow tip being of a diameter less than the inside diameter of said tubular valve member and providing with said tubular valve member an annular restricted flow path for cushioning movement of said tubular valve member into the bore in said seat member.

3. A fluid handling control valve including: an elongate tubular body with a cylinder portion intermediate its ends; said body having axially spaced radially inwardly projecting portions therein providing bores; a seat member disposed at one end of said body and having a bore terminating in a bottom closing the bore in said seat member; said body having a passage extending from said bore around said seat member; a tubular valve member shiftably disposed in said body and slidable in said bores in said inwardly projecting portions from an open position with said tubular valve member spaced from said seat member to a closed position with said tubular valve member extending into the bore in said seat member; sealing means on one of said members and engageable with the other of said members to prevent the flow of fluid between the members; a radially outwardly projecting piston on said tubular valve member operating between said inwardly projecting portions in said cylinder portion of said body; means for shifting said piston to shift said tubular valve member in opposite directions; said tubular valve member having equal opposed end areas exposed to fluid pressure in said bores; and said tubular valve member terminating in spaced relation to the bottom of the bore in said seat member when the valve is fully closed and forming with the bottom of the bore a space in which pressure of fluid in said tubular valve is imposed on the end of said tubular valve to counteract the effect of fluid pressure on the other end of said tubular valve.

4. A fluid handling control valve including: an elongate tubular body with a cylinder portion intermediate its ends; said body having abutment means at opposite ends of said cylinder portion projecting radially inwardly and providing bores; a seat member disposed at one end of said body and having a bore therein; said body and seat member having a passage by-passing said seat member; a tubular valve shiftably disposed in said body and slidable in said bores; a radially outwardly projecting piston on said valve operating between said abutment means in said cylinder portion of said body; means for shifting said piston to shift said valve in said bores to open and close said passage; said valve having equal opposed end areas exposed to fluid pressure in said bores; said seat member having a face closing the bore therein in opposed relation to one end of said valve; said face being spaced from the adjacent abutment means a distance greater than the length of said valve from said piston to the end of the valve, whereby said end of the valve is spaced from said face when the valve is fully closed and subjected to fluid pressure; and means providing a cylindrical seal between said end of the valve and the bore in said seat.

5. A fluid handling control valve including: an elongated tubular body with a cylinder portion intermediate its ends; said body having abutment means at opposite ends of said cylinder portion projecting radially inwardly and providing bores; a seat member disposed at one end of said body and having a bore therein; said body and seat member having a passage by-passing said seat member; a tubular valve shiftably disposed in said body and slidable into said bores; a radially outwardly projecting piston on said valve operating between said abutment means in said cylinder portion of said body; means for shifting said piston to shift said valve in said bores to open and close said passage; said valve having equal opposed end areas exposed to fluid pressure in said bores; said seat member having a face closing the bore therein in opposed relation to one end of said valve; and said face being spaced from the adjacent abutment means a distance greater than the length of said valve from said piston to the end of the valve, whereby said end of the valve is spaced from said face when the valve is fully closed and subjected to fluid pressure; a flow tip mounted on said face and having a diameter less than the inside diameter of said valve to provide an annular space therebetween; and means providing a cylindrical seal between said end of the valve and the bore in said seat.

6. A fluid handling control valve including: an elongate tubular body with a cylinder portion intermediate its ends and an inwardly projecting flange at one end of said cylinder portion and with a bore therethrough; a first closure at one end of the body and connected with a fluid handling duct to pass fluid; a seat in the body and carried by said closure and including a base with a bore therein terminating in a bottom; said closure having a flow passage therethrough around said seat; a second closure at the other end of the body and connected with a fluid handling duct and having a bore therethrough to pass fluid; a tubular valve opposed to the bottom of the seat and shiftable in the bores in the body, said second closure, said flange and said seat; said tubular valve having a flow passage therethrough; means providing a resilient peripheral seal engageable between said tubular valve and the bore in said base to prevent the passage of fluid around the end of said tubular valve through the flow passage around said seat; a piston on the tubular valve operating in the cylinder portion; means operable to shift the piston; and a flow tip projecting from the seat and cooperating with the valve; the tubular valve closing the body against the passage of fluid when engaged in the bore in the seat; the cross sectional areas of the ends of said tubular valve being the same so that the valve is balanced when under pressure; said tip being of less diameter than the flow passage through the tubular valve to provide an annular restriction therebetween extending into the flow passage through the valve when the latter is in said closed position to retard the escape of trapped fluid upon engagement of said peripheral seal means.

7. A fluid handling control valve including: an elongate tubular body with a cylinder portion intermediate its ends and an inwardly projecting flange at one end of said cylinder portion and with a bore therethrough; a first closure at one end of the body and connected with a fluid handling duct to pass fluid; a seat in the body carried by said closure and including a base with a bore therein terminating in a bottom closing said bore in said base; said closure having a flow passage therethrough around said seat; a second closure at the other end of the body connected with a fluid handling duct and having a bore therethrough to pass fluid; a tubular valve opposed to the bottom of the seat and shiftable in the bores in the body, the first closure, the flange and the seat; said tubular valve having a flow passage therethrough; means providing a resilient peripheral seal engageable between said tubular valve and the bore in said base to prevent the passage of fluid around the end of said tubular valve through the flow passage around said seat; a piston on the tubular valve operating in the cylinder portion; means operable to shift the piston; and a flow tip projecting from the bottom of the seat and having a curved exterior to enter the flow passage in the tubular valve; said curved exterior being spaced from the flow passage through the valve when the valve is fully closed and forming with the tubular valve member a restriction therebetween to retard the escape of trapped fluid upon engagement of said peripheral seal means; the tubular valve closing the body against the passage of fluid through said flow passage through said first closure when disposed in the bore in the seat; and the cross sectional areas of said bores and the ends of said valve being equal so that the valve is balanced when under pressure.

8. A fluid handling control valve including: an elongate tubular body having a flow passage extending axially therethrough; a tubular valve member shiftably disposed in said flow passage for reciprocation; means for reciprocating said tubular valve member; a seat member extending across said flow passage and having a bore for receiving one end of said tubular valve member upon movement of the tubular valve member in one direction; said body having a by-pass passage extending around said seat member for the flow of fluid past the seat member upon movement of the tubular valve member in the other direction; resilient sealing means on one of said members and engageable with the other of said members for preventing the flow of fluid between the bore in said seat member and said tubular valve member when said end of said tubular valve member is disposed in said bore; said tubular valve member having equal end areas, the entire end areas of said tubular valve member being subjected to fluid pressure in said flow passage when said tubular valve member is disposed in its fully closed position in the bore of said seat member.

9. A fluid handling control valve including: an elongate tubular body having a flow passage extending axially therethrough; a tubular valve member shiftably disposed in said flow passage for reciprocation; means for reciprocating said tubular valve member; a seat member extending across said flow passage and having a bore for receiving one end of said tubular valve member upon movement of the tubular valve member in one direction; said body having a by-pass passage extending around said seat member for the flow of fluid past the seat member upon movement of the tubular valve member in the other direction; resilient sealing means on one of said members and engageable with the other of said members for preventing the flow of fluid between the bore in said seat member and said tubular valve member when said end of said tubular valve member is disposed in said bore; said tubular valve member having equal end areas subjected to fluid pressure in said flow passage when said valve member is disposed in the bore of said seat member; said seat member including a flow tip extending into said bore and forming with the wall of the bore an annular space into which said one end of the tubular valve member extends; said flow tip being slightly smaller in diameter than said tubular valve member for forming a restricted annular flow path therebetween for cushioning movement of said tubular valve member into said bore.

References Cited in the file of this patent

UNITED STATES PATENTS

| | | |
|---|---|---|
| 1,270,214 | Ryan | June 18, 1918 |
| 1,925,531 | Grunsky | Sept. 5, 1933 |
| 2,619,120 | Page | Nov. 25, 1952 |
| 2,676,611 | Page | Apr. 27, 1954 |
| 2,679,261 | Otis | May 25, 1954 |

FOREIGN PATENTS

| | | |
|---|---|---|
| 49,950 | Switzerland | Dec. 6, 1909 |
| 404,794 | Italy | of 1943 |
| 969,077 | France | May 17, 1950 |
| 859,245 | Germany | Dec. 11, 1952 |
| 530,628 | Belgium | Aug. 14, 1954 |